E. E. BRADLEY.

AIR NOZZLE FOR TRACK SANDERS.

APPLICATION FILED APR. 24, 1922.

Reissued Sept. 12, 1922. 15,451.

Inventor

Elmer E. Bradley,

By George Neidman

Attorney

Witnesses

Milton Lenoir

H. A. Morell

Reissued Sept. 12, 1922. Re. 15,451

UNITED STATES PATENT OFFICE.

ELMER E. BRADLEY, OF CLINTON, IOWA.

AIR NOZZLE FOR TRACK SANDERS.

Original No. 1,280,146, dated October 1, 1918, Serial No. 210,922, filed January 8, 1918. Application for reissue filed April 24, 1922. Serial No. 556,341.

*To all whom it may concern:*

Be it known that I, ELMER E. BRADLEY, a citizen of the United States, and a resident of Clinton, in the county of Clinton and State of Iowa, have invented certain new and useful Improvements in Air Nozzles for Track Sanders, of which the following is a specification.

The invention relates to air nozzles for track sanders, that is to say for sand blowers employed for track sanding, and aims primarily to simplify and improve the construction and operation of devices of this character, as well as to increase the efficiency of the same.

A further object of the invention is to provide a nozzle for use in connection with the sand blower of a track sanding device which is constructed in such manner as to obviate the possibility of the air ports becoming sealed or clogged with sand or any foreign matter, thereby obviating the possibility of the sanding device being rendered inoperative.

A still further object is to provide an injector or nozzle which is composed of a few simple, inexpensive and easily assembled parts; which is capable of being readily detached from the trap of the sanding apparatus for the purpose of cleaning or repairing; which may be readily assembled or dismantled without the aid of special skill or tools and which will enable the sanding apparatus to be immediately responsive upon the application of air pressure.

With these objects in view, together with others which will appear as the description proceeds, the invention resides in the novel formation, combination and arrangement of parts, all as will be described more fully hereinafter, illustrated in the drawing and particularly pointed out in the claims.

In the drawing:—

Figure 4:
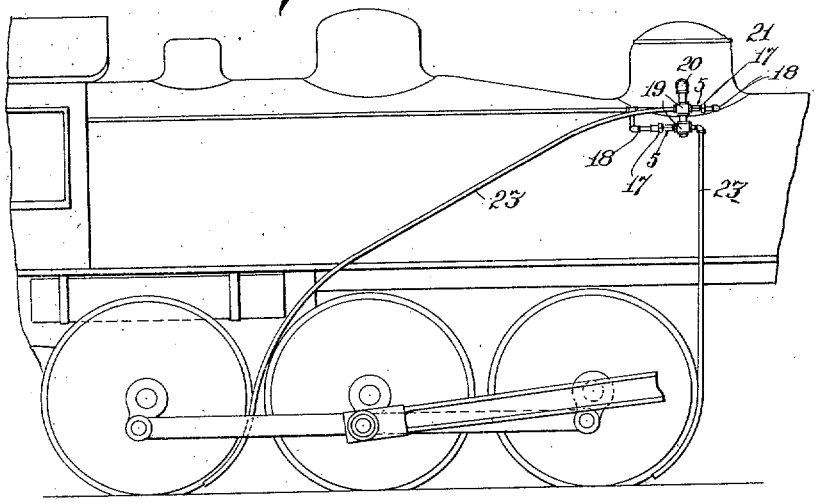
Figure 4 is a side elevation illustrating the application of my invention to a locomotive of which a portion only is shown.
Figure 1:
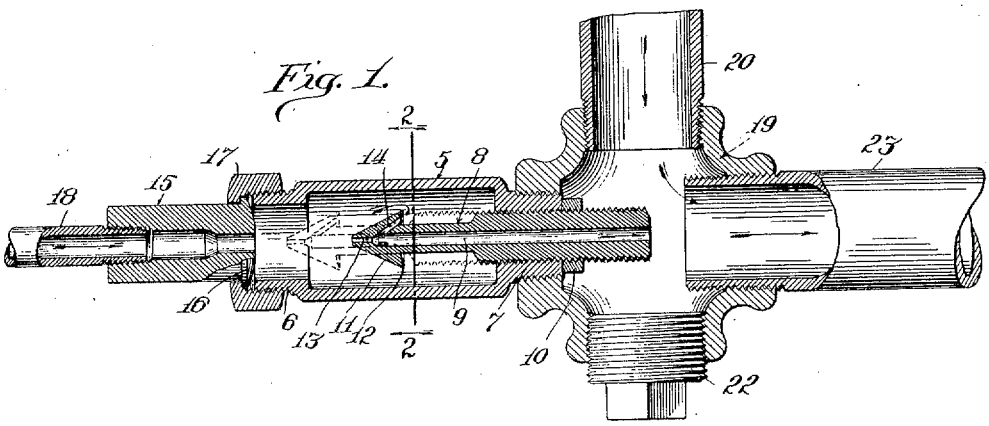
Figure 1 is a longitudinal sectional view of my invention.
Figure 3:
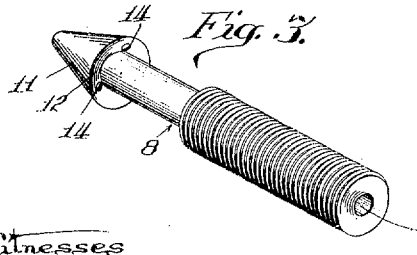
Figure 3 is a detail view in perspective of my improved nozzle.
Figure 2:
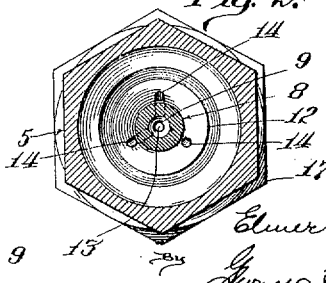
Figure 2 is a cross sectional view taken on the line 2—2 of Figure 1 looking in the direction of the arrows.

Referring now more particularly to the drawing, 5 indicates the casing for the injector or nozzle and is provided at its ends with reduced nipples 6 and 7. These nipples are provided upon their exterior surfaces with screw-threads as shown and the bore of the nipple 7 is internally threaded.

The improved air nozzle is indicated generally at 8 and comprises an elongated shank having a relatively large central bore 9 extending throughout substantially the entire length thereof. The forward end of this nozzle is enlarged and is externally threaded so as to permit the same being screwed into the bore of the nipple 7 and a jam nut 10 is threaded upon said forward end of the nozzle shank to hold the latter in proper adjusted position in the retaining nipple 7. The rear end of the nozzle is provided with a head 11; said head being pointed at its rear end and formed to provide an annular forwardly facing wall or shoulder 12 at the forward end thereof. A relatively small port or opening 13 extends from the point of the head 11 forwardly and communicates at its forward end with the larger bore 9 of the nozzle. The head 11 is also provided with a plurality of angularly disposed ports 14 which communicate at their inner ends with the bore 9 and extend forwardly and open in the forwardly facing wall or shoulder 12 of the head of the nozzle. With the construction shown, should the small bore 13 in the cone-shaped head 11 become clogged or stopped by any foreign matter, the air, which is introduced into the casing, will be permitted to pass through the nozzle by entering the ports 14 at the forward face or shoulder of the head 11 and thus permit the device to operate with the same effect as it would with port 13 unclogged or open.

To enable the improved injector or nozzle to be applied to the sanding apparatus of a locomotive, an internally threaded sleeve 15 is provided having an annular flange 16 at one end adapted to be engaged by and firmly held in position against the nipple 6 by a coupling nut 17. It will be understood that the threaded end of the sleeve 15 is intended to be secured to the end of a suitable air pipe or line which is indicated at 18; while the nipple 7 of casing 5, is intended to screw into a suitable trap or coupling 19, which is preferably of the four-way or cross type, the upper side or opening whereof is intended to receive a pipe or connection 20 leading from the usual sand-box 21 of the locomotive, while the downwardly disposed side or opening of the coupling, namely the opening diametrically opposite to the sand inlet pipe 20, is adapted to receive a suitable plug as at 22 to permit access to the coupling interior when occasion requires; and the side diametrically opposite to the side or opening receiving the nipple 7 is provided with an outlet or discharge pipe 23 which extends to or is connected with a pipe leading to a point in proximity to the wheels of the locomotive, so as to discharge the sand on the rail at a point adjacent to the tread of the wheel.

In operation, the sleeve 15 is connected to the nipple 6 of the casing 5 by a nut 17 and also connected to a suitable air line 18. Before the nipple 7 of the casing 5 is screwed into the trap or connection 19, the nozzle 8 is screwed lengthwise of the casing 5 so as to bring the forward end in the connection 19 at the desired distance removed from the discharge pipe 23, to adapt the nozzle to the grade of sand employed, after which the jam nut 10 is screwed lengthwise of the nozzle into firm relation with the nipple 7 of the casing and the latter then screwed into the connection or trap 19. The air entering through nipple 6 and into casing 5 will pass through the ports 13 and 14 and be caused to enter the bore 9 of the nozzle and be discharged into the connection or trap 19 at a point in direct alignment with the outlet pipe 23, thereby forcing the sand through the outlet or distributing pipe. With my improved construction, any foreign matter that may become lodged against the rear end of the head 11 so as to clog the port 13 will not interfere with the proper operation of the device, because the air entering casing 5 will pass through the forwardly opening ports 14 and be conveyed into the main bore 9 and thus ensure proper operation of the device; while the screwing of the nozzle further into or out of the casing 5 will adapt the device either to coarse or to light sand.

From the foregoing it is obvious that I have provided a nozzle for track sanding devices which will perform its functions perfectly and with the least possibility of being rendered inoperative. The various parts constituting the complete device are of simple and inexpensive construction, enabling the device to be easily taken apart and assembled and any of the parts to be replaced.

While the disclosed construction is the preferred embodiment of my invention, it is to be understood that changes in minor details and arrangement of parts may be resorted to without departing from the spirit of my invention.

What I claim is:—

1. In a device of the class described, a casing having an outlet in one end thereof, a nozzle adjustably secured in said outlet, said nozzle having ports communicating with the bore thereof, with some of the ports being disposed at an angle to the direction of said bore.

2. In a device of the class described, an open ended casing, a nozzle disposed lengthwise within the casing and secured in the outlet end thereof, a head on the end of said nozzle and provided with ports communicating with the bore of said nozzle, with certain of the ports being disposed at an angle to the direction of the bore.

3. In a device of the class described, a casing having an open end, a nozzle secured in said end so as to extend into said casing and constitute the outlet thereof, the inner end of said nozzle being provided with a head having a forwardly facing shoulder, said head being provided with a plurality of ports communicating with the bore of the nozzle, some of said ports being angularly disposed and extending rearwardly from the forwardly disposed shoulder of the nozzle-head.

4. In a device of the class described, a casing open at the ends thereof, a nozzle projecting into said casing through one of the ends thereof and constituting the outlet, a head on the rear end of said nozzle formed to provide an angular forwardly facing wall, the bore of said head being reduced at its end, said head being provided with angularly disposed ports opening in said wall and communicating at their inner ends with the bore of said nozzle.

5. In a device of the class described, a casing having exteriorly threaded nipples at the ends thereof, one of said nipples being interiorly threaded, an exteriorly threaded nozzle adapted to screw into said last mentioned nipple, a head on the inner end of said nozzle, a nut for locking said nozzle in place, a coupling nut threaded on the other nipple, and a sleeve held by said nut and communicating with the interior of said casing.

6. In a device of the class described, a casing adapted to communicate at one end with an air line, while the other end is adapted to connect with sand-conveying means, a nozzle adjustably secured in said casing, the end of the nozzle within the casing being provided with a head having a plurality of differently disposed ports communicating with the bore of the nozzle, with the forward end of the nozzle adapted to extend into said sand-conveying means.

7. In a device of the class described, an open ended casing adapted to have connection at one end with an air line, a sand trap or connection adapted to be secured to the other end of the casing; an elongated nozzle adjustably secured in said last mentioned end of the casing, extending into said casing and communicating with said trap or connection, the rear end of said nozzle being provided with a tapered head having a forwardly presented face, and a plurality of ports in said head communicating with the bore of the nozzle, with some of said ports converging rearwardly from the forwardly presented face of the head.

8. In a device of the class described, a casing provided with nippled ends, the one nipple being adapted to connect with an air line, while the other nipple is adapted to connect with a sand trap or connection, an elongated nozzle adapted to screw into the last mentioned nipple of the casing, said nozzle being threaded exteriorly to permit of longitudinal adjustment, and means whereby the nozzle may be held in its adjusted position.

9. In a device of the class described, a casing provided with nippled ends, the one nipple being adapted to connect with an air-line while the other nipple is adapted to connect with a sand-trap or connection, an elongated nozzle enlarged at the forward end and externally threaded, said nozzle being adapted to screw into the last mentioned nipple and permit of longitudinal adjustment of the nozzle, the inner end of the nozzle being provided with a tapered head formed to provide a forwardly presented face, the head being provided with a plurality of ports communicating with the bore of the nozzle, a portion of the ports being angularly disposed from the forward face of the head, and means whereby the nozzle may be locked in its adjusted position.

ELMER E. BRADLEY.

Witnesses:
E. H. Petersen,
H. G. Arp.